US007787825B2

(12) United States Patent
Mahajan

(10) Patent No.: US 7,787,825 B2
(45) Date of Patent: Aug. 31, 2010

(54) DATA BASED OVER THE AIR PROVISIONING FOR WIRELESS SERVICES

(75) Inventor: Sanjeev Mahajan, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1479 days.

(21) Appl. No.: 10/328,893

(22) Filed: Dec. 24, 2002

(65) Prior Publication Data

US 2003/0210657 A1 Nov. 13, 2003

Related U.S. Application Data

(60) Provisional application No. 60/378,704, filed on May 8, 2002, provisional application No. 60/378,927, filed on May 8, 2002.

(51) Int. Cl.
*H04B 17/00* (2006.01)
*H04L 12/66* (2006.01)
(52) U.S. Cl. ..................... 455/67.11; 370/352
(58) Field of Classification Search .............. 370/352, 370/241; 455/67.11
See application file for complete search history.

(56) References Cited

U.S. PATENT DOCUMENTS 6,301,471 B1 * 10/2001 Dahm et al. ............... 455/405
7,024,161 B1 * 4/2006 LaMedica, Jr. ........... 455/67.11

* cited by examiner

*Primary Examiner*—Rasha S Al Aubaidi
(74) *Attorney, Agent, or Firm*—Carmen Patti Law Group, LLC

(57) ABSTRACT

A wireless service provider recognizes a data transmission from a wireless user as a request to provision the mobile terminal and become a subscriber by an over the air process. An Internet protocol provisioning server automatically transmits a text-based message to be displayed on the user's equipment identifying information to be provided by the user for provisioning. In response the user transmits a reply text-based message to the server supplying the requested information. The server stores this information for utilization in provisioning the required infrastructure facilities. Provisioning data required to be stored in the user's equipment is downloaded to the user's equipment. This process permits an over the air provisioning to be accomplished without requiring the use of a voice channel between the user and a customer service representative of the wireless service provider.

19 Claims, 6 Drawing Sheets

DATA BASED OVER THE AIR PROVISIONING FOR WIRELESS SERVICES

RELATED APPLICATIONS

This application is related to provisional applications serial Nos. 60/378,704 and 60/378,927 both filed on May 8, 2002 that are incorporated herein by reference.

BACKGROUND OF THE INVENTION

This invention generally relates to telecommunication systems that provide wireless communications for subscribers, and more specifically relates to over the air provisioning of a new or existing mobile terminal and wireless user as a subscriber.

A common way of provisioning a mobile terminal is by the new user visiting a service provider store for the desired wireless service. The service center can provide the user with a new mobile terminal that has been provisioned to access the service provider's network and for subscriber specific data or can reconfigure a compatible mobile terminal already owned by the user. The mobile terminal to be used by the new subscriber has to be registered with the service provider. Either the dealer provides information about the new user and the new mobile terminal to the service provider, or provides the user with instructions for calling the service provider to register as a new subscriber.

Another common way to provision new mobile terminal is using Over the Air Service Provisioning (OTASP). This involves the new subscriber initiating OTASP session from their terminal and providing their details in a voice conversation to the Customer Service Representative (CSR) followed by CSR performing OTASP using Short Message Service (SMS) based IS683 messaging.

FIG. 1 illustrates a known wireless telecommunication system in which a user desires to provision a new mobile terminal 10 for service. The system includes a base station 12 and a mobile switching center 14 coupled to the base station by communication links 16 and 18. A voice network 20, e.g. the public switched telephone network, is coupled with a mobile switching center 14 and a telephone 22 of a customer service representative of the wireless network. A workstation 24 is also utilized by the customer service representative in a work area 26 that also includes telephone 22. The workstation is utilized by the customer service representative to provide commands and data to various components associated with the telecommunication system. A billing center 28, authentication authorization and accounting (AAA) center 30, voicemail center 32, message center 34, and home location register 38 are elements that typically must be provisioned to support new users by the customer service representative using workstation 24. Over The Air Function (OTAF) 36 is used to send IS683 provisioning commands to the new mobile terminal. Elements 36 and 38 are coupled by communication channels 40 and 42, respectively, to the mobile switching center 14. Elements 36 and 38 are coupled by communication channel 43.

A typical process of initially provisioning a new mobile terminal 10 for service begins with the user causing mobile terminal 10 to establish communications with base station 12. The user has been provided with instructions to then press a series of buttons. These series of buttons cause a predetermined dialed number sequence recognized by the mobile switching center 14 as representing a request to provision a mobile terminal. Normally, a request for access to the service provider's network from an unregistered mobile terminal would be denied. Since the mobile switching center 14 recognized receipt of the special predetermined number, it initiates a voice communication link by voice network 20 to customer service representative telephone 22. The customer service representative engages in a voice conversation with the user of mobile terminal 10 and obtains needed information from the user in order to provision network services. The needed information may include the user's name, mailing address, billing information and billing address, requested telephone number (if any), service options elected, etc. At the conclusion of the voice call the user is advised by the customer service representative how long it will take before the user will become a registered subscriber in the system so that wireless telecommunications services can be accessed. The customer service representative, using workstation 24, provides the appropriate commands and data to network elements 28, 30, 32, 34, and 38 to cause the new user to become a registered subscriber. The customer service representative, using workstation 24, provides the appropriate commands and data to network element 36 to cause the mobile terminal 10 to be provisioned with the necessary data to function properly. The interfaces 40, 42, 43 and 44 are known, i.e. based on standards. Network elements 28, 30, 32, 34, 36, and 38 may be made by a variety of different companies and use a variety of communication protocols that must be supported by the workstation 24 to access and communicate with each. Thus, each of the network elements that require provisioning may have to be separately provisioned due to the lack of a common standard controlling the provisioning of these elements.

In general, the initial provisioning of a new subscriber by using a voice call between the subscriber and customer service representative of the service provider has been effective. This is not an efficient process from the service provider's perspective since it requires the use of a voice channel and the availability of a customer service representative. From the perspective of a subscriber who is primarily seeking wireless voice communications, the process is effective. However, for a subscriber who is primarily or only interested in data services, the requirement to establish a voice call with the customer service representative is an undesired burden, especially when the subscriber will be using a data-only mobile terminal that is not capable of voice. This is especially troublesome for a new subscriber for data-only wireless services, such as a subscriber desiring to utilize a wireless data card with his personal digital assistant or a laptop computer. Thus, there exists a need for an improved process and corresponding infrastructure to minimize these disadvantages and automate the over the air provisioning of wireless users.

SUMMARY OF THE INVENTION

It is an object of the invention to provide a data based over the air provisioning process, and corresponding improved infrastructure for provisioning a mobile terminal and subscriber over the air for wireless communication services without requiring a voice communication with a customer service representative of the service provider.

In accordance with an embodiment of the invention, a provisioning server includes a receiver for receiving a first IP packet from a wireless user indicating that the user seeks to become a new subscriber or provision the mobile terminal. A mechanism is provided for automatically transmitting second packets to the wireless user containing requests for information to be displayed on a screen of a device used by the wireless user. The packet receiver receives third packets from the wireless user containing responses to the information sought by the second packets. A storage device stores the information provided by the wireless user in a database for use in provisioning wireless services for this user.

A method for provisioning a mobile terminal over the air for wireless communication services without requiring a voice communication with a customer service representative of the service provider is also an embodiment of the present invention.

BRIEF DESCRIPTION OF THE DRAWINGS

If the same element appears in multiple Figures, the same reference numeral is used in each of the Figures to reference the same element.

DETAILED DESCRIPTION OF EMBODIMENTS

Figure 1:
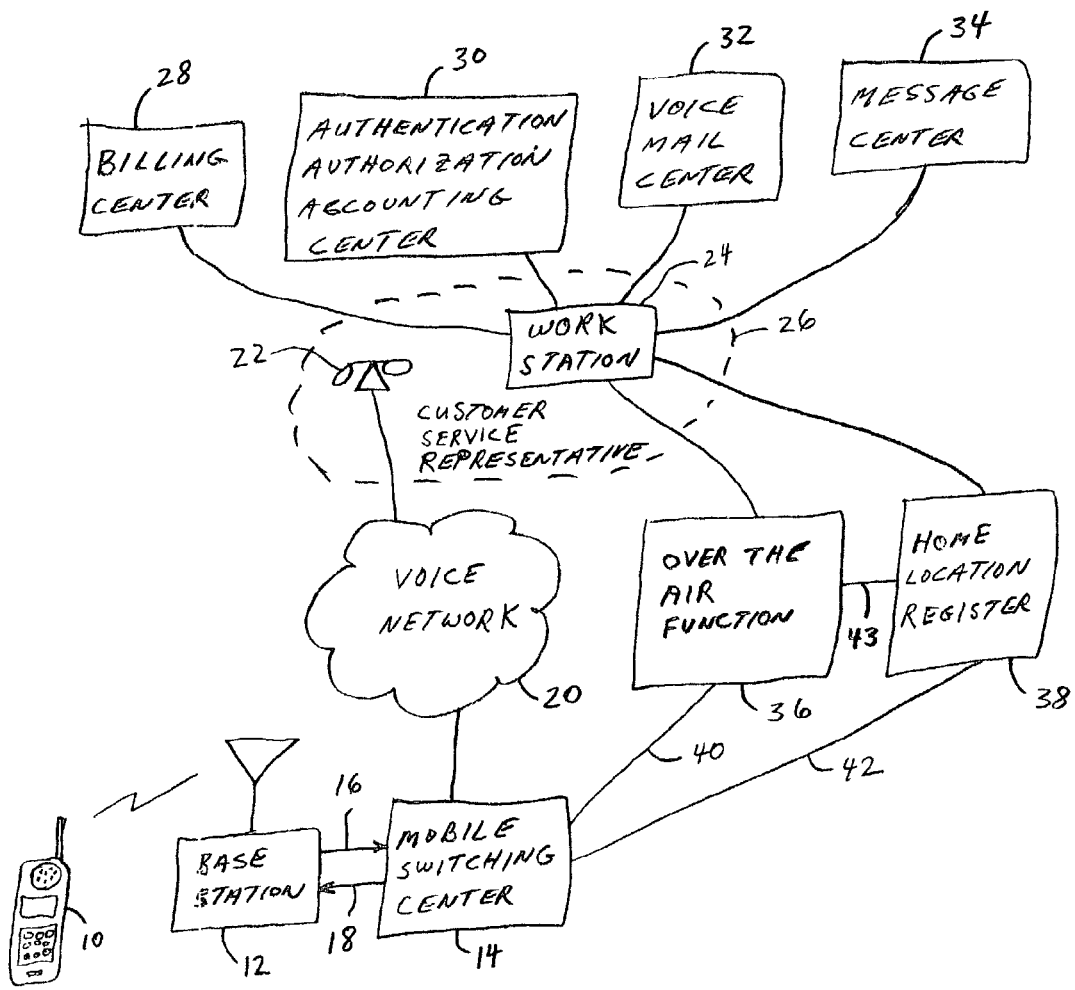
FIG. 1 is a block diagram illustrating a communications system in accordance with a prior art process and architecture used for over the air service provisioning of new wireless users via a voice conversation with a customer service representative.
Figure 2:
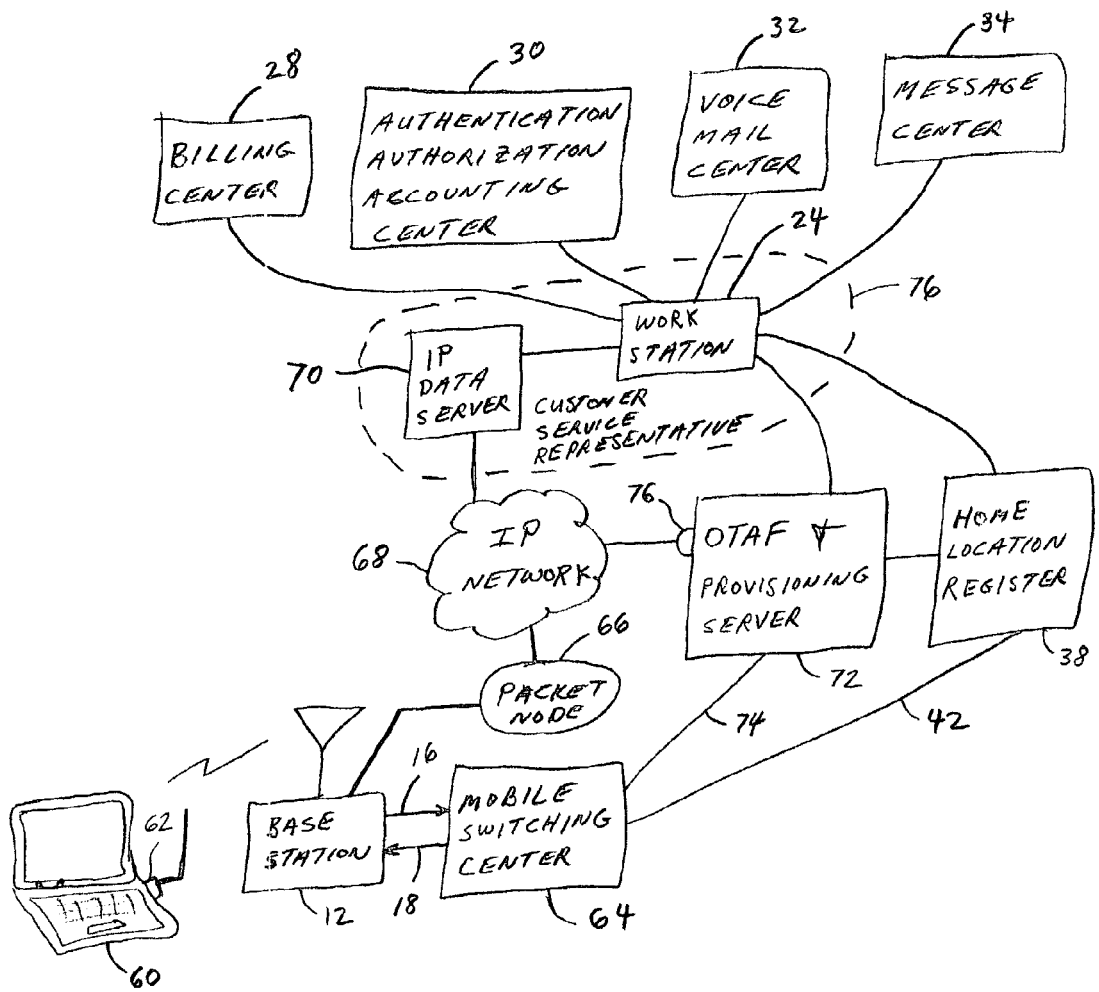
FIG. 2 is a block diagram of a communications system that incorporates an embodiment of the present invention.

Automated Collection of needed Subscriber Information without Setting up a Voice Call FIG. 2 illustrates a communications system that incorporates an embodiment of the present invention. The user's wireless equipment may include a conventional mobile terminal with text messaging, a personal digital assistant with wireless communications capabilities, a laptop personal computer with a wireless communication capability, or any device capable of wireless communications that directly or indirectly provides the user with a visual display of received text As used herein, text-based information means information intended to be presented visually for interpretation by a person such as alphanumeric characters, as opposed to information intended to be presented aurally such as spoken words. In the illustrative embodiment a laptop computer 60 includes a wireless data card 62 suited for communications with base station 12. A mobile switching center 64 is coupled by communication channels 16 and 18 with base station 12. The base station 12 is connected by packet data switching node 66 and IP network 68 with OTAF & Provisioning Server 72. The mobile switching center is also connected to the OTAF 72 by communication channel 74. The OTAF 72 is substantially the same as the OTAF 36 shown in FIG. 1 except that it includes an IP interface 76 that permits it to send and receive IP packets by IP network 68. The OTAF 72 communicates with IP data server 70 via IP network 68.

The OTAF & Provisioning Server 72 plays an important role in this embodiment of the present invention. It receives user-provided information contained in packets and automatically transmits queries for information from the user that are presented on the user's display. This allows the user, over a non-voice communication channel, to initiate a request to become a wireless subscriber, receive instructions and requests for user information needed to become a subscriber, and transmit the required information to the service provider. As shown in FIG. 2, the exemplary OTAF & Provisioning Server 72 is connected to the IP data server 70 via the IP Network 68. The IP Data Server 70 is connected to workstation 24 of customer service representative facility 76. The IP data server 70 is automated and programmed to present the data collected from subscriber by OTAF & Provisioning Server 72 to the workstation 24. OTAF & Provisioning Server 72 is automated and programmed to conduct a communication session with the user to obtain information needed to establish wireless services for the user in response to receiving a user-provided request for such services. Although the IP data server 70 is shown as a separate device in FIG. 2, it will be apparent to those skilled in the art that the functionality of the IP data server could be incorporated into other elements, e.g. workstation 24.

As previously explained with regard to FIG. 1, a customer service representative utilizing workstation 24 establishes services for a new wireless user by provisioning a corresponding new user account/record on the billing center 28, authentication authorization and accounting center 30, voicemail center 32, message center 34, and the home location register 38. Using the OTAF part of the OTAF & Provisioning Server 72, the Mobile Terminal 62 can also be provisioned over the air. The registration information gathered by provisioning server part of the OTAF & Provisioning Server 72 can be stored in the IP data server 70 for presentation on the workstation 24 for use by a customer service representative who will provision the required elements to establish the user as a registered subscriber. Alternatively, the registration information received from OTAF & Provisioning Server 72 by the IP data server can be displayed on the screen of the workstation 24 for near real-time use by the customer service representative.

Figure 3:
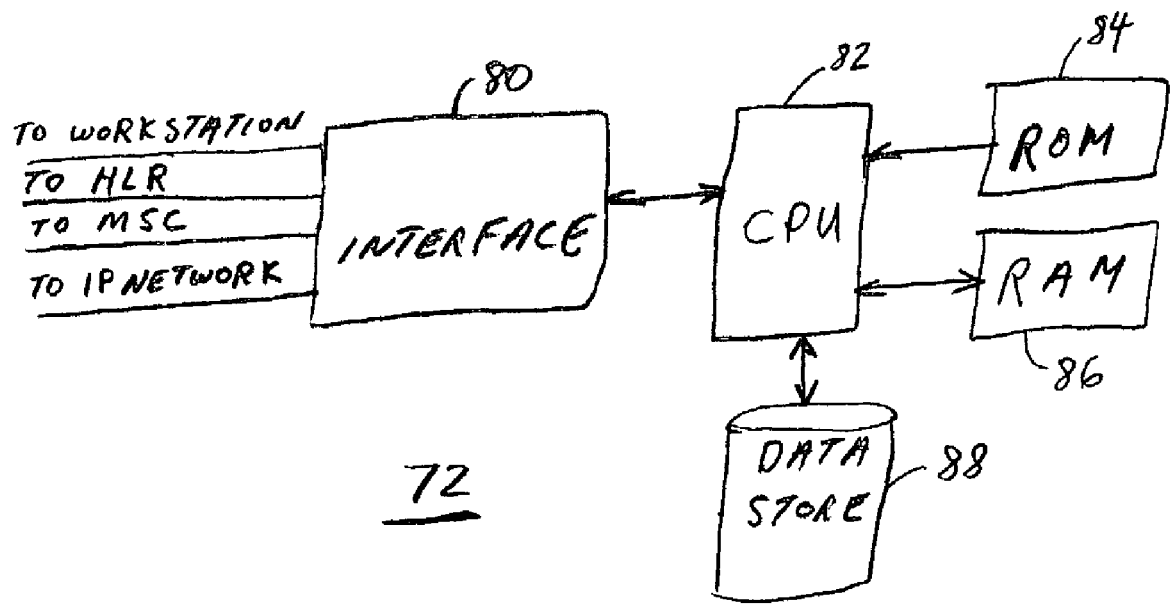
FIG. 3 is a block diagram of the OTAF & provisioning server as shown in FIG. 2.

FIG. 3 is a block diagram of an OTAF & Provisioning Server 72. An interface 80 enables communications with the workstation 24, home location register 38, mobile switching center 64, and IP network 68. A central processing unit (microprocessor) 82 is supported by read-only memory (ROM) 84, random access memory (RAM) 86, and data storage device 88. This structure supports both the OTAF and the provisioning server function. Since the OTAF is known (see OTAF 36 in FIG. 1), only the operation of the provisioning server will be discussed.

Instructions stored in the memory elements of the provisioning part of OTAF & Provisioning Server 72 enable the CPU 82 to be able to receive and transmit packets, especially packets to and from a user seeking to become a wireless subscriber. In response to receipt of a packet from the user representing a request to become a new subscriber, the CPU automatically generates and transmits packets to the user seeking information required for registration as a subscriber. The information sought from the user is displayed on the screen of the device associated with the user. The user responds to the requested information by sending the requested information in packets to provisioning part of OTAF & Provisioning Server 72. This user information is received and stored by provisioning part of OTAF & Provisioning Server 72 for sending to the Server 70 for use by a customer service representative in provisioning services for the user.

Thereby provisioning part of OTAF & Provisioning Server 72 provides an automated facility for obtaining user-information required in order to provision the user over the air as a new wireless subscriber by a customer service representative. This process is completed without a voice communication channel being established between the user and a customer service representative, and without direct communications between the user and the customer service representative.

The IP Data Server 70 may have a structure identical to that shown in FIG. 3 except that the interface would be connected to the workstation and the IP Network. The operation of server 70 is consistent with known servers that function to gather and store information for use by a served function, the workstation in this case.

An exemplary method for new wireless user registration is explained with reference to FIG. 2. The vendor of the wireless data card 62 will have provided the user with software for laptop computer 60 to enable communications between the computer and modem of commands, status information, and data transfer. The user is provided with software, such as from the vendor of the wireless data card or the wireless service provider, to enable the laptop computer 60 to communicate with the wireless service provider. In this example the wireless data card vendor or the wireless service provider has pre-provisioned the wireless data card with information on System Selection or included in the computer laptop software the same information such that it is available to the wireless data card for the purposes of system selection. If such a list had not been provided, the software shall provide means of specifying the system to select. The wireless data card shall acquire the wireless system based on the system selection criteria or specified system.

Upon acquiring the wireless system and upon the initiation of a request by the user to become a subscriber via laptop computer 60, an origination message is sent from the computer by wireless data card 62 and base station 12 to mobile switching center 64. The origination message will typically include information identifying a packet data service option depending on the capabilities of the user's equipment (laptop 60 and wireless data card 62) and the system selected. The origination message will also include an IP Based Over the Air Provisioning feature code, identifying the user as requesting initial service provisioning via a data channel.

Upon receipt by the mobile switching center 64 of the origination message with the IP Based Over the Air Provisioning feature code, the user will be recognized as needing provisioning. The establishment of a restricted data traffic channel, radio link protocols and point-to-point protocols will be facilitated even though a lookup of the registration of the user in the home location register will fail since the user is not a currently registered subscriber. The data traffic channel supports communications between the user's equipment and the provisioning part of OTAF & Provisioning Server 72 via base station 12, packet data switching node 66, and IP network 68. In order to facilitate data communications with the user's equipment, the provisioning part of OTAF & Provisioning Server 72 sends its IP address via mobile switching center to the user's equipment.

Once the user's equipment is synchronized and on the assigned data traffic channel, an over the air provisioning application on laptop 60 will send a message (packet) to the provisioning part of OTAF & Provisioning Server 72 requesting provisioning as a new subscriber. In response to the receipt of this message, the provisioning part of OTAF & Provisioning Server 72 will launch an over the air the air provisioning application program that will generate and transmit packets to the user's equipment containing requests for needed information that will be displayed on the screen of laptop 60. For example, the information needed for provisioning may be specified as a table or form format displayed on the screen of the laptop to be completed by the user. Once the user has entered the requested registration information and indicated the completion of the table or form, the over the air application on laptop 60 will transmit the provisioning information entered by the user by packets to provisioning part of OTAF & Provisioning Server 72. Known techniques in validating user inputs are preferably employed to check for errors in the information provided by the user. If an error is determined, the provisioning part of OTAF & Provisioning Server 72 will transmit additional packets to the user's equipment seeking corrected data. Once the information provided by the user is determined to be acceptable, the information can be stored as a record in a database of provisioning part of OTAF & Provisioning Server 72 for use in provisioning the user as a new subscriber. If the provisioning does not occur immediately following the completion by the user of the requested information, the user can be transmitted a message indicating the anticipated time in which the provisioning will be completed. Preferably this record is transmitted to IP data server 70 as soon as it is complete in anticipation of use by a customer service representative.

Alternatively, following the collection of information from the user by provisioning part of OTAF & Provisioning Server 72 an IP based message shall be sent to IP data server 70, a customer service representative may be immediately alerted to a request for provisioning by the transmission of a message from the IP data server to workstation 24. This preferably occurs while the data traffic channel with the user is still open. This permits the customer service representative using workstation 24 and IP data server 70 to "chat" with the user if needed using a data channel. For example, data entered by the user may be determined to be invalid based upon inspection by the customer service representative, or data that was entered by the user may not be understood by the customer service representative. Clarification of the error can be addressed by communications between the user and the customer service representative by the transmission of messages (packets) over the data traffic channel. Once the customer service representative is satisfied with the information supplied by the user, the customer service representative can immediately begin the provisioning of the required infrastructure elements and data terminal 62 by workstation 24. Depending on the time required for the customer service representative to complete the provisioning, the user may be asked to remain on the data traffic channel. Assuming that the user remains on the data traffic channel and the customer service representative completes the provisioning of the required infrastructure elements, the user will be notified of the successful completion of such provisioning and provisioning data required to be stored in the user's equipment is downloaded to laptop 60 using the established communication link to complete the provisioning of the user as a subscriber. If the customer service representative cannot complete the provisioning of the required infrastructure elements within a reasonable time while the user remains on the established data channel, the data channel can be released and the user instructed to re-establish a specified communication link at a time when the provisioning of the infrastructure elements will have been completed in order to receive the download of data to be stored on the subscriber's equipment.

Automated User Registration and Provisioning

Figure 4:
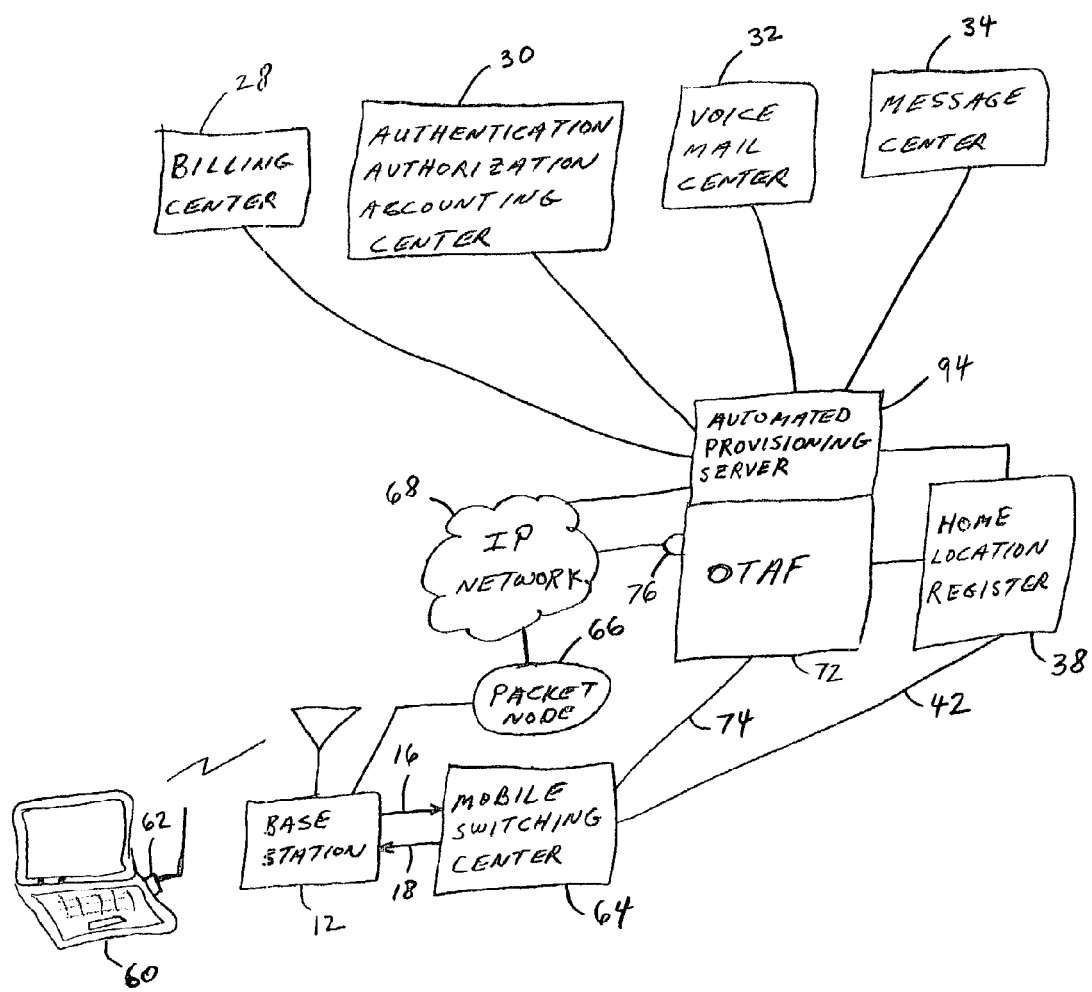
FIG. 4 is a block diagram of a communications system that incorporates a further embodiment of the present invention.

FIG. 4 illustrates a wireless communications system that incorporates a further embodiment of the present invention in which the registration and provisioning of services for a new wireless subscriber are totally automated. That is, the over the air collection of user information required for registration and the provisioning of various wireless infrastructure facilities are accomplished without any intervention by a customer service representative. Further, this embodiment provides for such automation without the use of a voice channel.

Comparing FIG. 4 with FIG. 2, it will be seen that the illustrated embodiments have substantial similarities. Only the differences associated with the embodiment of FIG. 4 relative to FIG. 2 will be discussed. The automated provisioning server 94 incorporates the functionality of Provisioning Server part of OTAF & Provisioning Server 72 (FIG. 2) in obtaining and validating user supplied registration information over a data traffic channel. After validating the user's registration information, this information is parsed to separate the information as required for provisioning by different infrastructure elements 28, 30, 32, 34, 38, and mobile terminal 62. Server 94 includes communications and protocol interfaces required to provision new users on each of the required infrastructure facilities. After the user provided information has been parsed, the information required for provisioning is automatically transmitted to each infrastructure facility. After the infrastructure facilities have been provisioned, server 94 transmits instructions to the OTAF & Provisioning Server 72 and mobile switching center 64 causing data required to be stored in the user's equipment to be downloaded to the user's equipment. This completes the provisioning of the infrastructure facilities and of the user's equipment whereby the user is now a registered subscriber in the wireless communications system.

The automated provisioning server 94 is shown in FIG. 4 as being associated with the OTAF 72. This association is suggested merely as a matter of convenience since the functions of the automatic registration server and feature provisioning server are related. It will be apparent to those skilled in the art that the automated provisioning server 94 could comprise a stand-alone facility, or be integrated as part of another facility in the communications system.

Figure 5:
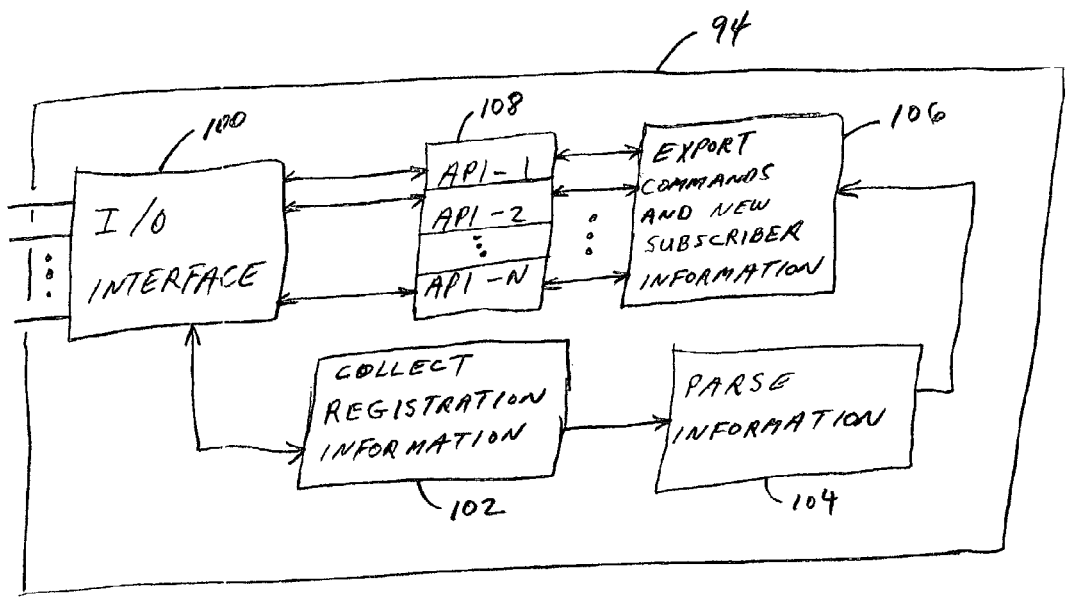
FIG. 5 is a functional block diagram of the automated provisioning server as shown in FIG. 4.

FIG. 5 illustrates a functional block diagram of the automated provisioning server 94. It includes an input/output interface 100 for communications with the various infrastructure facilities and IP network 68. A function 102 for collecting registration information is coupled to the input/output interface 100 and provides similar functionality to Provisioning Server 72 with regard to the collection of user registration information. A parse information function 104 operates on the collected user registration information and separates the information so that the appropriate information can be communicated to each of the infrastructure provisioning facilities. In block 106 commands utilized in provisioning a new subscriber are transmitted to the various infrastructure facilities along with the collected new subscriber information obtained from the parse information function 104. A series of application programming interfaces API-1 through API-N are provided by block 108 wherein each of the infrastructure provisioning facilities are supported by an application programming interface. Thus, commands and data can be transmitted between the automated provisioning server 94 and each of the infrastructure provisioning facilities since the different communications protocols and command structures used by the different infrastructure facilities are accommodated. Communications between the application programming interfaces and the respective infrastructure provisioning facilities are facilitated through the input/output interface 100.

Figure 6:
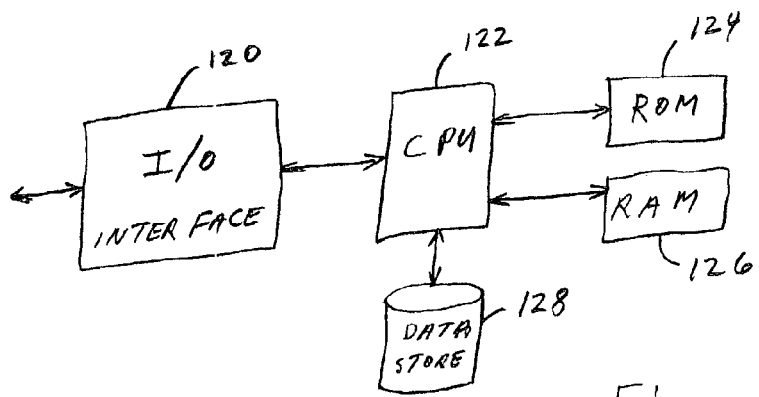
FIG. 6 is an exemplary block diagram of an implementation of FIG. 5.

FIG. 6 shows an exemplary construction of the automated provisioning server 94. An input/output interface 120 facilitates communications to and from central processing unit 122. A read-only memory 124, random access memory 126, and a data storage device 128 are connected to and support the central processing unit 122. These memory elements store control instructions enabling the central processing unit to carry out the functions as described with regard to FIG. 5.

Figure 7:
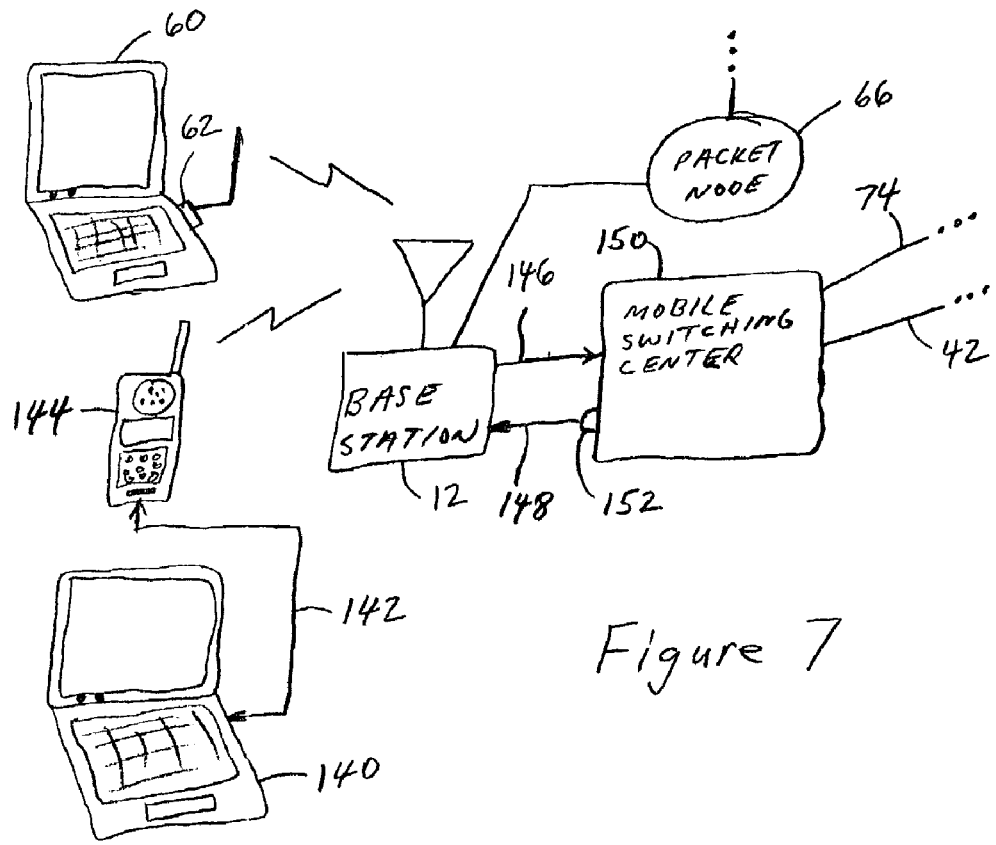
FIG. 7 is a partial block diagram of a communications system that incorporates another embodiment of the present invention.

FIG. 7 is a partial block diagram of a wireless communications system incorporating another embodiment of the present invention that is suited for use with the systems as shown in FIGS. 2 and 4. As described with regard to previous embodiments, a first user of laptop computer 60 and wireless data card 62 seeks to become a provisioned subscriber of wireless services. A second user associated with laptop computer 140 also seeks to become a provisioned subscriber. Laptop computer 140 is connected by cable 142 with a wireless device 144 such as a mobile terminal with wireless data capabilities. Base station 12 provides a wireless communications link with these users and is coupled by communication channels 146 and 148 to mobile switching center 150. The base station 12 is also connected to packet data switching node 66. Mobile Switching Center 150 is connected via communication channels 74 and 42 to other infrastructure facilities as explained in prior embodiments.

Laptop computers 60 and 140 support Internet protocol (IP) and the higher level-transmission control protocol (TCP) over IP. In a preferred embodiment, a standardized IP port number is assigned for use by wireless communication devices so that provisioning information can be transmitted to the wireless communication devices using TCP/IP by the port number address. The over the air provisioning application software on the user's laptop is programmed to be aware of the standardized IP port number and to monitor the receipt of data on this port. The data required to be stored on the user's wireless equipment to support communications with the service provider and provide service, can be provisioned over the air by sending the required information by TCP/IP from the OTAF 72 to the IP port number assigned for receipt of such information on a wireless device to be provisioned. The use of TCP/IP provides for increased data size. The use of a standardized IP port number allows provisioning data to be directly transmitted to the user's equipment without requiring that the user's equipment have a specified status or condition, such as requiring the user's equipment to have an Internet browser that is active.

Figure 8:
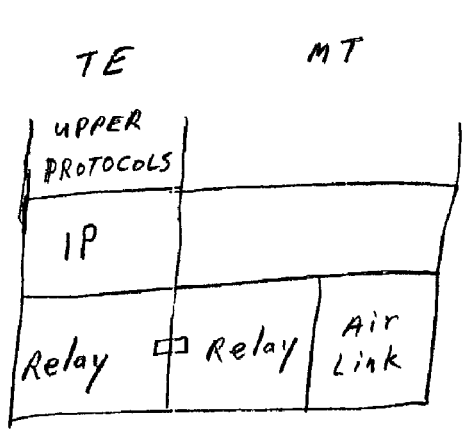
FIGS. 8 and 9 illustrate different protocol architectures that may be utilized by the subscriber's wireless mobile equipment to connect with the data terminal equipment.

FIG. 8 illustrates the communication protocols or layers available for communications between a mobile terminal (MT) such as wireless data card 62 and terminal equipment (TE) such as laptop computer 60. The mobile terminal includes an air link for communications with base station 12 that supports the air link protocol. The mobile terminal also supports communications with the terminal equipment by a relay link protocol. The terminal equipment also supports IP and upper-level protocols such as TCP. In accordance with the embodiment as explained in FIG. 7, the terminal equipment (laptop computer 60) will support TCP/IP and would contain over the air provisioning application software that would support the assigned IP port number for the receipt of provisioning data.

Figure 9:
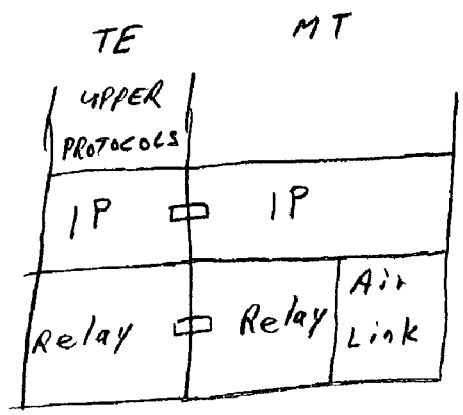

FIG. 9 illustrates the communication protocols or layers available for communications between a mobile terminal such as mobile terminal 144 and terminal equipment such as laptop computer 140. The protocols illustrated in FIG. 9 are different from those shown in FIG. 8 in that the mobile terminal (mobile terminal 144) also supports IP. Thus, laptop 140 and mobile terminal 144 can communicate either at the IP level or at the relay level. As illustrated in FIG. 9, the mobile terminal does not support upper protocols. Even if the mobile terminal was configured to support upper protocols such as TCP, it would normally be very difficult for user to enter the required alphanumeric provisioning data using only the limited keypads normally provided for mobile terminals. Therefore, it is preferred that the terminal equipment (laptop 140) utilize the upper protocols including TCP for entering the data required from the user. Since mobile terminal 144 can be used independent of laptop computer 140, the provisioning data to be stored in the user's equipment will be stored in mobile terminal 144. This can be accomplished by laptop 140 receiving the required data by TCP/IP to the assigned port and then transferring the data to the mobile terminal 144.

For mobile terminals that have a built in browser and support a complete TCP/IP stack the TCP/IP port for receiving the provisioning data may reside in the mobile terminal. The application to collect the user data may run on the mobile terminal or on the terminal equipment if one is attached to the mobile terminal.

Although embodiments of the present invention have been described and shown in the accompanying drawings, the scope of the invention is defined by the appended claims. Elements in the claims are not intended to be construed according to a "means plus function" meaning unless the explicit use of the word "means" is recited in the corresponding claim element.

The invention claimed is:

1. A provisioning server for use in a telecommunication system that serves wireless data subscribers comprising:
    means for receiving a first IP data packet containing first information that represents a request from a wireless mobile terminal of a wireless data user seeking to become a new subscriber of communication services provided by the telecommunication system and provisioning of the mobile terminal, where said first information contains digital data that does not represent words spoken by the wireless data user,
    means, responsive to receipt by said receiving means of the first information, for automatically transmitting to the wireless user second packets containing requests for information to be displayed on a screen of a device used by the wireless user in communicating with said provisioning server;
    said receiving means further receiving third packets from the wireless user containing responses by the user to the information sought by said second packets;
    means for storing said information in a database for use by a customer service representative in provisioning services for the mobile terminal of the data user where no previous registration information for the mobile terminal is accessible to the provisioning server, whereby the automated collection of needed information from a new mobile terminal is accomplished without requiring voice communication between the customer service representative and the data user.

2. The provisioning server according to claim 1 further comprising means for validating the information received in said third packets prior to said storing means storing the information in the database.

3. The provisioning server according to claim 1 wherein said receiving means receives said first and third packets from the wireless data user without a call with a voice channel having been established between the provisioning server and the wireless data user.

4. The provisioning server according to claim 3 wherein said first packet is received from the wireless data user as a data packet without a call with a voice channel having been established between the provisioning server and the wireless data user.

5. The provisioning server according to claim 1 wherein said receiving means receives said first and third packets from the wireless data user without requiring voice communication between the customer service representative and the data user.

6. The provisioning server according to claim 1 wherein said storing means stores said information in the database for use by a customer service representative in provisioning services for the data user where no information relating to mobile terminal or the data user is accessible to the provisioning server prior to receipt of said first IP data packet that represents a request from the wireless data user seeking to become a new subscriber not currently registered for wireless services from any service provider.

7. The provisioning server according to claim 1 wherein said storing means stores said information in the database for use by a customer service representative in provisioning services for the data user where no information relating to any data user of the mobile terminal is accessible to the provisioning server prior to receipt of said first IP data packet that represents a request from the wireless data user seeking to become a new subscriber not currently registered for wireless services from any service provider.

8. A provisioning server for use in a telecommunication system that serves wireless data subscribers comprising:
    means for receiving a first IP data packet containing first information that represents a request from a wireless mobile terminal of a wireless data user seeking to become a new subscriber and provisioning of the mobile terminal, where no previous registration information for the mobile terminal is accessible to the provisioning server;
    means, responsive to receipt by said receiving means of the first information, for automatically transmitting to the wireless user second packets containing requests for information to be displayed on a screen of a device used by the wireless user in communicating with said provisioning server;
    said receiving means further receiving third packets from the wireless user containing responses by the user to the information sought by said second packets;
    means for storing said information in a database for use by a customer service representative in provisioning services for the data user, whereby the automated collection of needed information from a new user is accomplished without requiring voice communication between the customer service representative and the data user, wherein said first information contained in the first packet, the requests contained in the second packets, and the responses contained in the third packets each consist of text-based information.

9. The provisioning server according to claim 8 wherein said storing means stores said information in the database for use by a customer service representative in provisioning services for the data user where no information relating to the mobile terminal or data user is accessible to the provisioning server prior to receipt of said first IP data packet that represents a request from the wireless data user seeking to become a new subscriber not currently registered for wireless services from any service provider.

10. The provisioning server according to claim 8 wherein said storing means stores said information in the database for use by a customer service representative in provisioning services for the data user where no information relating to any data user of the mobile terminal is accessible to the provisioning server prior to receipt of said first IP data packet that represents a request from the wireless data user seeking to become a new subscriber not currently registered for wireless services from any service provider.

11. A method for provisioning of a new subscriber of wireless data services without requiring a voice communication link with the new subscriber comprising the steps of:

receiving a first IP data packet containing first information that represents a request from a wireless mobile terminal of a data user seeking to become a new subscriber and provisioning of a mobile terminal, where said first information contains digital data that does not represent words spoken by the wireless data user;

automatically transmitting to the wireless user second packets containing requests for information to be displayed on a screen of a device used by the wireless user in communicating with a provisioning server in response to receipt of the first information;

receiving third packets from the wireless user containing responses by the user to the information sought by said second packets;

storing said information in a database for use by a customer service representative in provisioning services for the data user where no previous registration information for the mobile terminal is accessible to the provisioning server, whereby the automated collection of needed information from an unprovisioned mobile terminal is accomplished without requiring voice communication between the customer service representative and the data user.

12. The method according to claim 11 further comprising the step of validating the information received in said third packets prior to the storing of the information in the database.

13. The method according to claim 11 wherein said first information contained in the first packet, the requests contained in the second packets, and the responses contained in the third packets each consist of text-based information.

14. The method according to claim 11 further comprising the steps of: establishing transmission control protocol/Internet protocol (TCP/IP) communications between a node in the wireless network and the user's wireless equipment;

transmitting provisioning data to be stored by the user's wireless equipment over the TCP/IP communications link from the node to a specified Internet protocol port number recognized by the user's wireless equipment; and storing the received provisioning data in memory associated with the user's wireless equipment.

15. The method according to claim 11 wherein said first and third packets are received from the wireless data user without a call with a voice channel having been established between the provisioning server and the wireless data user.

16. The method according to claim 15 wherein said first packet is received from the wireless data user as a data packet without a call with a voice channel having been established between the provisioning server and the wireless data user.

17. The method according to claim 11 wherein said first and third packets are received from the wireless data user without requiring voice communication between the customer service representative and the data user.

18. The method according to claim 11 wherein said step of storing stores said information in the database for use by a customer service representative in provisioning services for the data user where no information relating to the mobile terminal or data user is accessible to the provisioning server prior to receipt of said first IP data packet that represents a request from the wireless data user seeking to become a new subscriber not currently registered for wireless services from any service provider.

19. The method according to claim 11 wherein said step of storing stores said information in the database for use by a customer service representative in provisioning services for the data user where no information relating to any data user of the mobile terminal is accessible to the provisioning server prior to receipt of said first IP data packet that represents a request from the wireless data user seeking to become a new subscriber not currently registered for wireless services from any service provider.

* * * * *